United States Patent Office 2,971,700
Patented Feb. 14, 1961

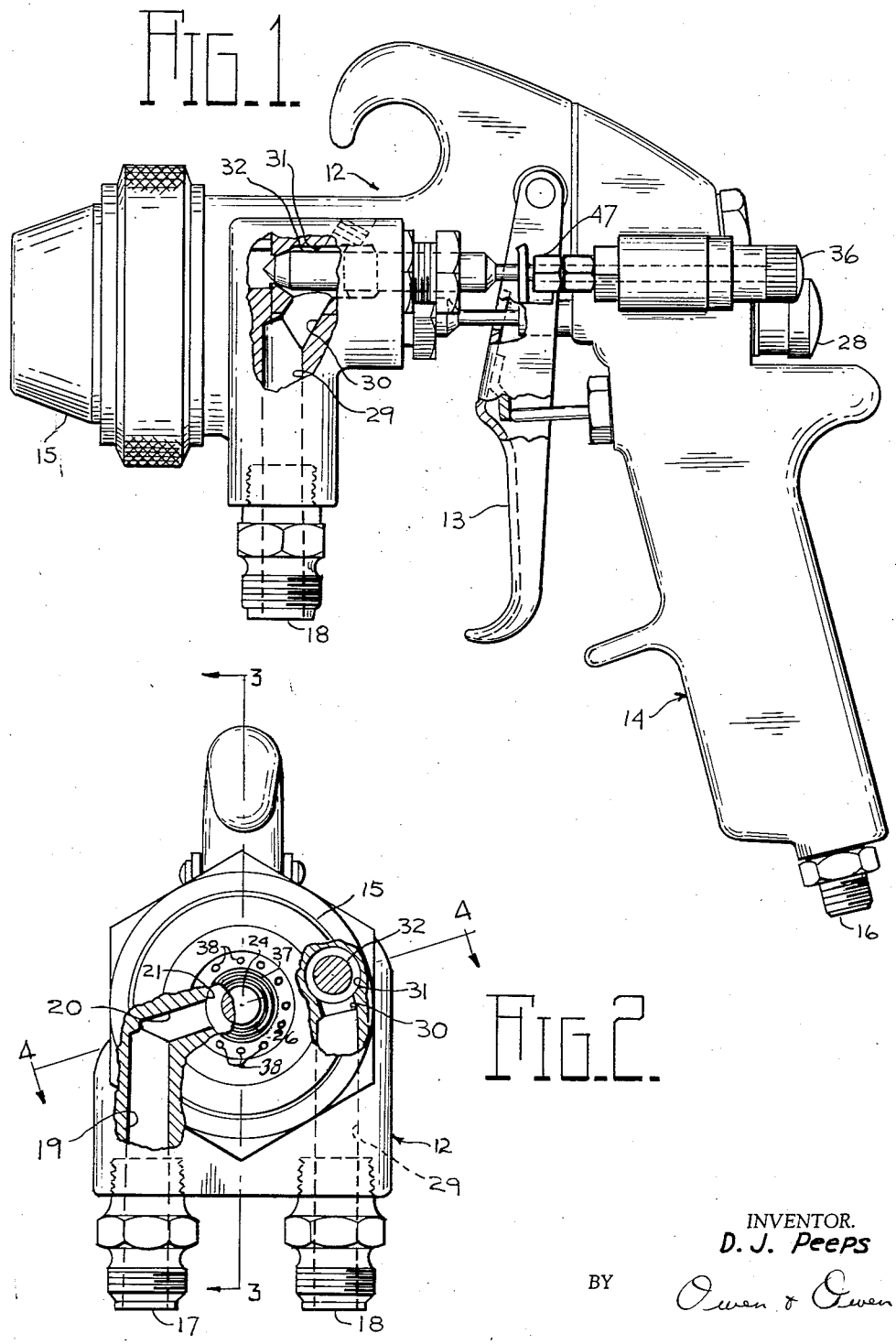

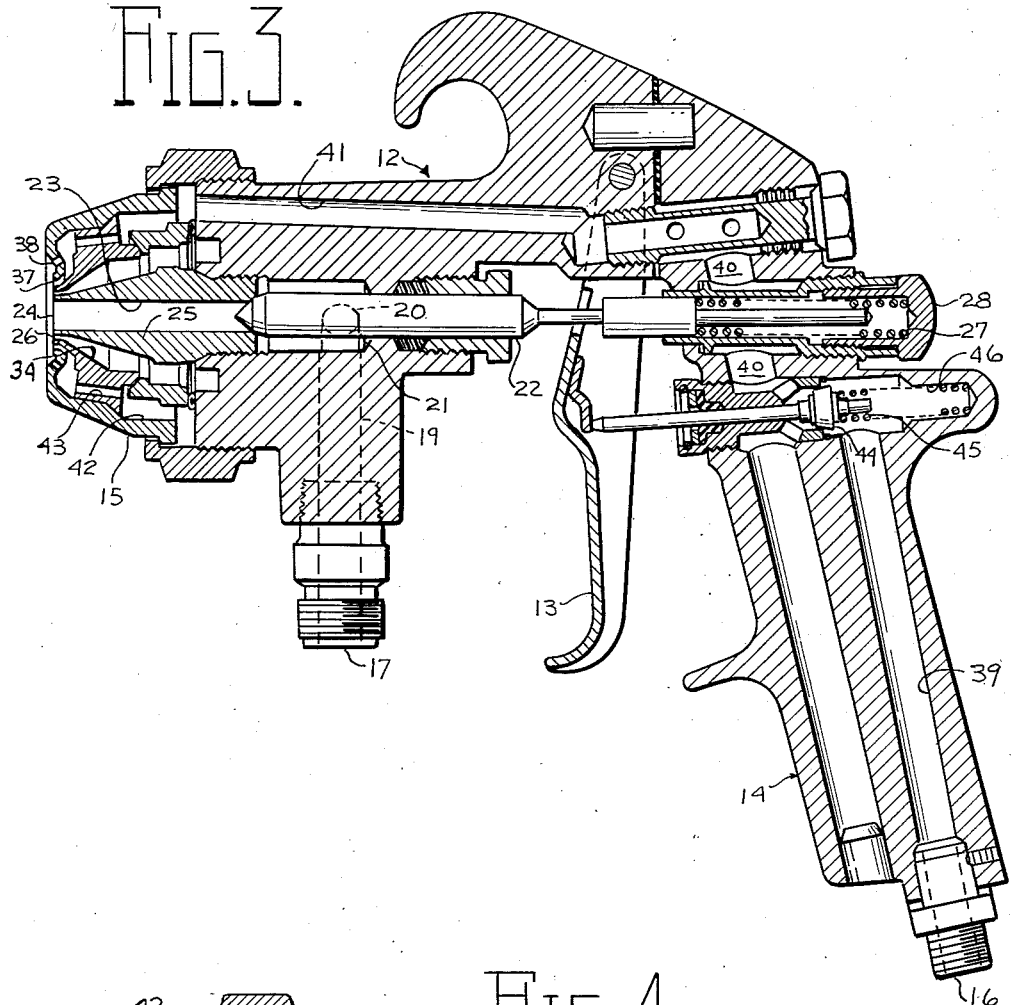
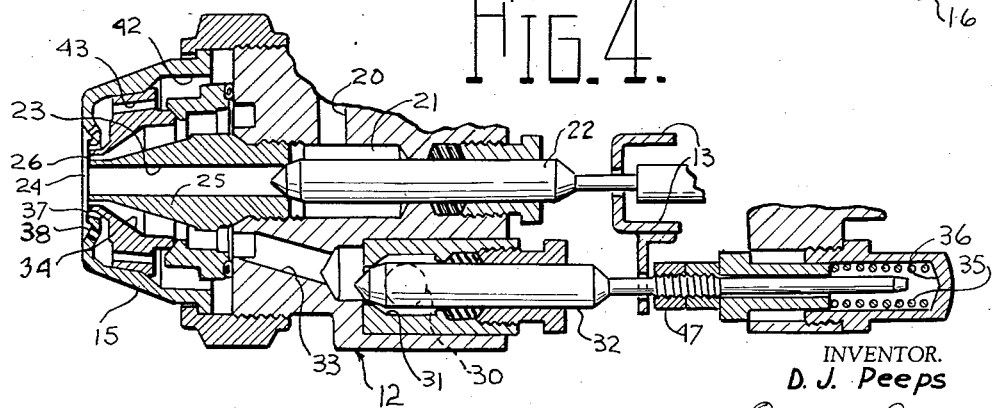

2,971,700

APPARATUS FOR COATING ARTICLES WITH CHEMICALLY REACTIVE LIQUIDS

Donald J. Peeps, Rossford, Ohio, assignor to The De Vilbiss Company, Toledo, Ohio, a corporation of Ohio Filed July 22, 1957, Ser. No. 673,426

3 Claims. (Cl. 239—296)

This invention pertains to a method of and apparatus for coating an article with liquid coating material and more specifically liquid coating material formed of at least two liquid portions that chemically react when mixed.

The relatively recent development and widespread employment of sprayable plastics of various types have created a need for suitable apparatus for applying these materials as a coating on articles in a quick and efficient manner. These materials cannot be applied in the conventional manner and with conventional spray apparatus since the materials are usually comprised of two or more chemically reactive portions that must be maintained separate from each other until the reaction is intended and desired.

In producing a coating of foam plastic, for example, two separate portions of polyester resin are employed. The first portion contains an isocyanate in addition to the resin and the second contains resin and added water and an amine. When the two portions are combined, the amine acts as an accelerator between the isocyanate and the polyester resin and the resulting rapid reaction forms carbon dioxide in the mixture, causing it to foam. The reaction also causes the mixture to harden. It will be readily apparent that, if the first portion were combined with any of the second portion before passing through an atomizing nozzle, foaming and hardening would begin at that point. Even though the reaction were not sufficiently rapid to affect atomization, there would still be the hazard that the combined portions would react within the atomizing apparatus when it is not operating and cause the nozzles to become plugged or the flow control valves and other movable parts to stick.

When coating with a mixture of any two liquid portions, if the amount of one portion is small it can be admitted to an air stream and emitted through the nozzle in combination therewith. The larger portion can then be emitted through an adjacent nozzle to form a second stream contiguous to the stream consisting of the air and the first portion. The larger portion is atomized in a conventional manner by the coaction of the two streams. It has been discovered, however, that when the amount of the first portion to be combined with the air exceeds approximately 22 percent of the total mixture, it cannot be effectively atomized in this manner.

While a relatively small quantity of liquid can be effectively entrained with the atomizing air, attempts to introduce larger quantities of liquid result in the extraction of so much energy from the air that the remainder is insufficient to atomize the main liquid stream satisfactorily. It would be possible, of course, to increase the size of the air passages and thus the available energy, but to do so results in a spray gun that is cumbersome in size and difficult to control. To produce a rigid foam coating a large proportion (approximately 50%) of a high viscosity catalyst is used with a high viscosity resin. Since each portion is thus substantially more than 22 percent of the total mixture, neither can be properly atomized if the air stream is relied on to carry it and this method of atomization cannot be satisfactorily employed.

In view of the above problems, coating apparatus has been devised with which two chemically reactive liquids can be efficiently atomized and applied to an article to be coated in any proportion. The liquids are maintained separately from each other until outside the atomizing apparatus and at the point of atomization, prior to contacting the surface of the article. The numerous advantages of coating by atomization are attained with this apparatus with none of the concomitant disadvantages of inadequate atomization, plugging, sticking or the like, that would normally result from combining the materials before atomization takes place.

When any separate portions are to be combined and atomized in the proposed manner, they must be thoroughly mixed before being applied to the article. This mixing cannot begin until the materials are combined outside the spray apparatus. The mixing must, therefore, be started and completed between the time the portions leave the spray apparatus and the time they contact the article to be coated. To accomplish this, the new spray apparatus includes concentric nozzles through which the separate portions are emitted from the apparatus. The liquid streams thereby created have large surfaces adjacent each other and which are symmetrically disposed about the common axes of the streams. This arrangement permits rapid, thorough mixing of the streams when they mix with an adjacent air stream. The air stream then both atomizes and mixes the two streams in one operation.

The new apparatus has applicability to many other materials that act in an analogous manner to the aforementioned materials although their chemical reactions may be different and produce different results. In any case, when the chemical reactions between the two portions are detrimental to proper atomization the new apparatus overcomes this difficulty.

This apparatus may also be used advantageously when a relatively viscous material is to be combined with a relatively thin material to form a coating mixture. In such a process, the viscous portion may sometimes be heated to produce substantially the same viscosity as the other, thinner portion in order to achieve a uniform coating material. The two portions cannot, of course, be heated to the same extent since the viscosity of both portions would then be decreased. With the use of the new apparatus, the one portion may be heated and conveyed separately and then combined with the other portion outside of the spray apparatus at or near the point of atomization.

It is an object of the invention to provide a simple and efficient apparatus which will permit coating of articles with a mixture of two or more separately maintained liquids.

Another object of the invention is to provide means for thoroughly mixing two or more coating liquid portions substantitally at the time they are atomized and before they are applied to the article to be coated.

Other objects and advantages of the invention will appear from the following detailed description of a particular embodiment thereof, reference being made to the accompanying drawings, in which:

Fig. 1 is a side view with parts broken away, of apparatus embodying the invention;

Fig. 2 is a front view, also with parts broken away, of the apparatus of Fig. 1;

Fig. 3 is a cross-sectional view on line 3—3 of Fig. 2; and

Fig. 4 is a fragmentary, cross-sectional view on line 4—4 of Fig. 2.

A specific embodiment of the present invention is shown in the drawings and comprises a spray gun body 12 to which a trigger 13 is pivotally attached in the usual manner. A handle 14 extends from the rear of the body and carries an air inlet 16 extending therefrom for connection to a conventional source of compressed air which is used to mix and atomize liquids discharged from the spray gun as hereinafter described.

At its front end, the gun body 12 carries a nozzle housing or air cap 15 which surrounds and retains inner and outer fluid tips as hereinafter described which cooperate to form separate and distinct concentric passages for each of two liquids which it is desired to spray as a mixture. In spray guns of the prior art, mixing of the liquids takes place within the spray cap and before discharge, whereas in the spray gun of the present invention two concentric streams of liquid are discharged in closely surrounding relationship and are instantly mixed and atomized.

The liquids to be sprayed are brought into the gun body 12 from inlets 17 and 18. A first liquid portion is supplied through the inlet 17 and conduits 19 and 20 to a chamber 21. A needle valve 22 is provided which is opened by the trigger 13. When the valve is opened the liquid flows through a bore 23 to a discharge opening 24 at the end of a first stationary cap member or inner fluid tip 25. The fluid tip 25 forms in its interior the first liquid passage and its exterior cooperates with the inner diameter of a second concentric, stationary cap member or fluid tip 26 which closely surrounds and overlies the inner fluid tip 25. The valve 22 is held in a normally closed position by a spring 27 which is retained in an end cap 28.

A second liquid portion is supplied through the inlet 18 and conduits 29 and 30 (see Fig. 2) to a generally horizontal chamber 31. A second needle valve 32 is provided which is also opened by the trigger 13, and when the valve 32 is open, the second liquid flows through a passage 33 (Fig. 4) and an annular space 34 and to the outer fluid tip 26. The openings in the outer fluid tip 26 may be in the form of a ring or a series of holes or slots, being represented in the drawings as a ring. The valve 32 is held in a closed position by a spring 35 in an end cap 36.

Air may be supplied to a circular series of air nozzles or jets 37 and 38 in the air cap 15 in any suitable manner. Jets 37 in the air cap may be in the form of a circular series of holes or a continuous opening formed by spacing the air cap 15 from the outer fluid tip 26, being shown in the drawings as a ring or continuous opening. In the embodiment shown, air flows through the inlet 16, passages 39 and 40, bore 41, annular space 42, and ports 43 to the jets 37 and 38. A valve 44 is located between th passages 39 and 40 and is opened by the trigger 13. The valve 44 is held in a closed position by a spring 45 in a recess 46. The jets 37 may be directed axially while jets 38 are directed inwardly towards the liquid streams, or all of the air jets may be directed inwardly at the same or different angles, whichever best promotes the desired atomization.

When the trigger 13 is initially depressed, it first opens the valve 44, thus causing air to flow to the air jets 37 and 38. As the trigger 13 is further depressed, the valve 22 is opened and admits the first liquid portion to the inner fluid tip 25 and its discharge orifice 24. The valve 32 may be opened at substantially the same time as the valve 22 to cause the second liquid portion to flow to the annular opening of the outer fluid tip 26. The sequence in which the valves 22 and 32 are opened may be changed by adjusting a nut 47 (Fig. 4) for the valve 32. The proportion of the two liquid portions may be varied by regulating their pressures, by adjusting the nut 47, or by changing the dimensions of the inner fluid tip 25.

The liquids are kept separately in all portions of the spray gun until they are emitted through the inner and outer fluid tips. The liquid streams are concentric, and one surrounds the other to enable them to be thoroughly mixed by the air stream from the jets 37. Although a portion of this air stream may be parallel to the liquid streams, it causes rapid mixing because the streams have different moments of inertia and/or velocities. Therefore, the air stream interacts with the liquid streams a short distance downstream of the openings of the fluid tips. The air stream also causes the concentric liquid streams to atomize at the same time they are mixed to form a single, uniform mixture by the time the articles to be coated are reached. The converging air streams from the air jets 38 aid in mixing and atomizing the liquid streams.

Since the air emerging from jets 37 and 38 is completely unencumbered by entrained liquid, it retains all of its original energy and thus very effectively atomizes the concentric liquid streams and mixes the two liquids intimately. The flow rate of the air is not retarded by any liquid and the orifices which form the air jets can be made small and as close to the liquid streams as may be desired.

The invention thus basically comprises spraying apparatus that is capable of spraying two chemically reactive liquid portions onto articles in a quick, efficient manner. The separate liquids are thoroughly mixed and atomized by unencumbered, full velocity air streams, as equally and thoroughly as are single liquids in conventional spray guns. Separate conduits and concentric nozzles are provided for each liquid to maintain each separately until atomization is effected by the unencumbered air streams and thereby plugging or clogging of the spray apparatus is prevented. The invention thus combines the advantages of air atomization with the advantages of a two-liquid coating material.

While the invention has been described in connection with a specific form and disposition of the parts, it should be understood that it is capable of numerous modifications and changes without departing from the appended claims.

I claim:

1. A spray gun for spraying an article with a coating material formed of two liquid portions which react chemically when combined, said spray gun comprising a first stationary cap member having a central passage terminating in a central liquid discharge orifice, a second stationary cap member cooperating with said first member to form a second passage terminating in a liquid discharge orifice located concentrically about said first liquid orifice, a third stationary cap member cooperating with said second member to form an air conduit, means to isolate said air conduit from both of said central and second passages, separate air nozzles at the end of said air conduit in spaced relationship to said liquid orifices, means for supplying a first completely liquid portion to said first liquid orifice, means for supplying a second completely liquid portion to said second liquid orifice, means for supplying unencumbered air to said air nozzles, separate needle valve means capable of independent operation for controlling each of the liquid supply means, a separate air valve means, and a trigger for operating all of said valve means.

2. A spray gun for spraying an article with a coating material formed of two liquid portions which react chemically when combined, said spray gun comprising a nozzle housing having a central stationary member forming a first central liquid discharge orifice, partition means in said housing cooperating with said member to form an annular liquid passage terminating in a second liquid discharge orifice located concentrically about said first liquid orifice, the discharge ends of said first and second orifices being disposed in a common plane, means in said housing cooperating with said partition means to form an air passage, means isolating said air passage from both of said central and annular liquid passages, separate air nozzles communicating with said air conduit and disposed in spaced relationship to said liquid orifices, at least a portion of the axes of said air nozzles intersecting the axes of said liquid orifices downstream of the nozzle housings whereby the first intermixture of air and liquid takes place outside said nozzle housing, a first liquid passage for supplying a first liquid portion to said first liquid orifice, a second conduit for supplying a second completely liquid portion to said annular passage and second liquid orifice, said first and second conduits lying in side-by-side relationship, a third conduit isolated from said first and second conduits for supplying unencumbered air to said air passage and nozzles, a separate needle valve capable of independent operation in each of said liquid conduits, a valve in said air conduit, and a single trigger operatively associated with all of said valves for opening said valves when depressed, said air valve being opened prior to either liquid valve.

3. A spray gun according to claim 1 characterized by means associated with said trigger for adjusting one of the liquid conduit valves independently of the other liquid conduit valve to change the sequence of opening of said liquid conduit valves and to change the amount the one liquid valve is opened with respect to the amount the other liquid valve is opened.

References Cited in the file of this patent

UNITED STATES PATENTS

| | | |
|---|---|---|
| 1,997,874 | Power | Apr. 16, 1935 |
| 2,504,117 | Downs | Apr. 18, 1950 |
| 2,786,716 | Peeps | Mar. 26, 1957 |

FOREIGN PATENTS

| | | |
|---|---|---|
| 163,640 | Australia | June 27, 1955 |